Patent …

United States Patent [19]

Doty

[11] Patent Number: 4,763,926
[45] Date of Patent: Aug. 16, 1988

[54] WEB-SENSITIVE RETRACTOR LOCK-OUT MECHANISM

[75] Inventor: Gerald A. Doty, Crown Point, Ind.

[73] Assignee: Gateway Industries, Inc., Olympia Fields, Ill.

[21] Appl. No.: 883,074

[22] Filed: Jul. 8, 1986

Related U.S. Application Data

[63] Continuation-in-part of Ser. No. 835,604, Mar. 3, 1986, Pat. No. 4,708,364.

[51] Int. Cl.⁴ .............................................. B60R 21/10
[52] U.S. Cl. ...................................... 280/808; 280/801
[58] Field of Search ...................... 242/107.4 A, 107.2; 280/808, 801

[56] References Cited

U.S. PATENT DOCUMENTS

| | | | |
|---|---|---|---|
| 3,764,161 | 10/1973 | Bright et al. | 280/803 |
| 4,361,294 | 11/1982 | Doty | 280/802 |
| 4,371,126 | 2/1983 | Tsuge | 280/808 |
| 4,371,127 | 2/1983 | Shimogawa | 280/808 |
| 4,498,642 | 2/1985 | Doty | 280/808 |
| 4,545,546 | 10/1985 | Kawaguchi et al. | 280/806 |

Primary Examiner—Richard A. Bertsch
Attorney, Agent, or Firm—Fitch, Even, Tabin & Flannery

[57] ABSTRACT

A passive seat belt system is provided with a door mounted retractor operable by a remotely located inertia sensing device on the vehicle chassis. The door mounted retractor has an electrically operated means to lock the retractor reel against turning when operated by the inertia sensing device. The retractor is also provided with a mechanically operated web sensitive device to lock the reel against belt pay out at high reel angular accelerations. The web sensitive device includes an inertia wheel secured on the portion of reel shaft and mounted on the shaft so as to be rotatable with respect thereto. A coiled spring concentric with the shaft has its first end fixed to the shaft and its second end fixed to the inertia wheel so as to prevent relative rotation between the inertia wheel and the shaft. An annulus is mounted on the shaft so as to permit rotation of the shaft with respect thereto. The annulus has side walls overlying the coiled spring, and an arm is integral with the annulus for engaging the locking bar. Engagement of the arm with the locking bar occurs when the rate of angular velocity of the reel due to safety belt protraction increases at a rate at which the coiled spring can no longer exert a force to overcome the angular momentum of the inertia wheel. In consequence, the coiled spring radially expands and engages the side walls of the annulus to cause the annulus to rotate in unison with the shaft. Thus the arm on the annulus is rotated into engagement with the lock bar to move the lock bar into engagement with the teeth of the ratchet wheels.

10 Claims, 3 Drawing Sheets

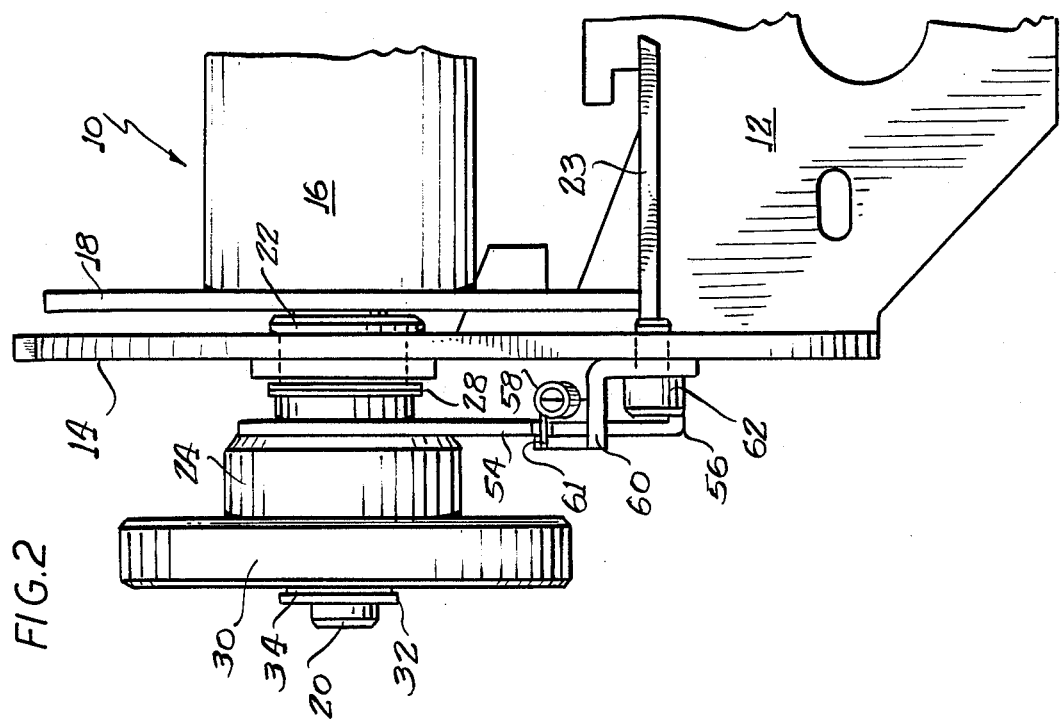
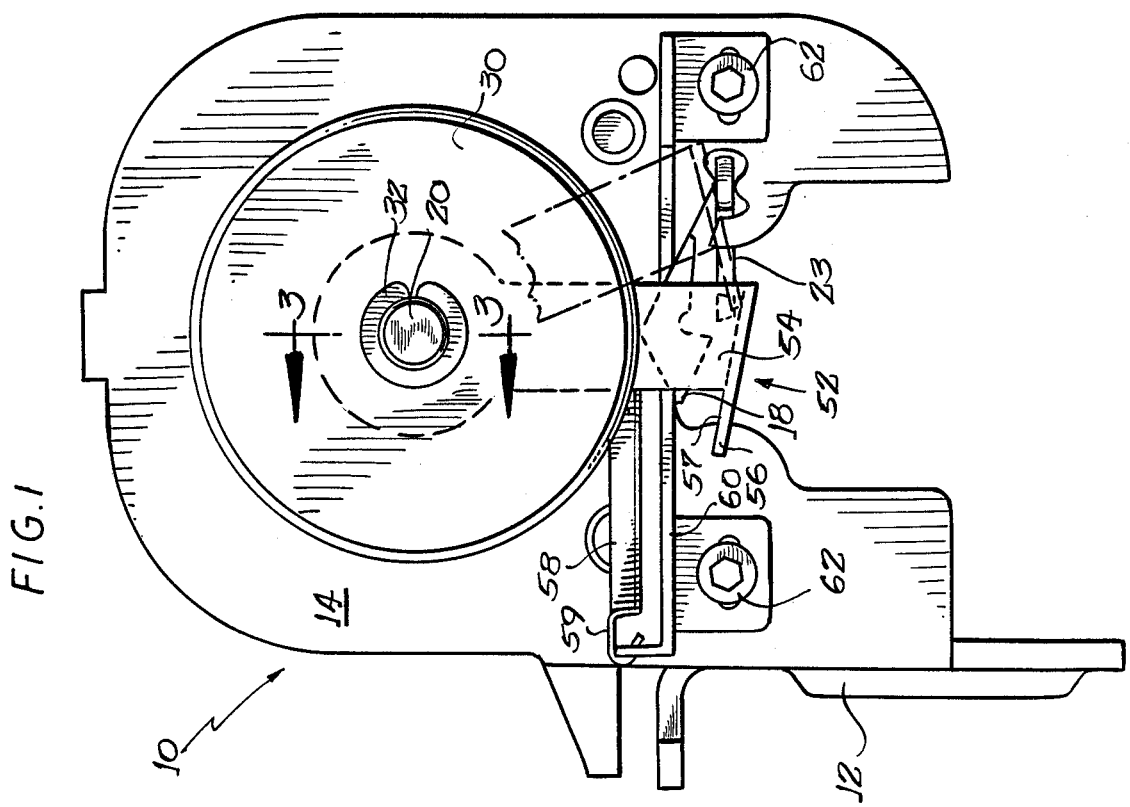

WEB-SENSITIVE RETRACTOR LOCK-OUT MECHANISM

This invention is a continuation-in-part application of U.S. Ser. 835,604 filed Mar. 3, 1986, now U.S. Pat. No. 4,708,364 and more particularly is directed to providing a door mounted, remotely operated locking retractor with a mechanism for locking the belt-carrying reel of the retractor against unwinding rotation if the speed at which the belt is being unwound increases faster than a predetermined rate.

Seat belts are ubiquitous, but ever since their early introduction a major problem has been to provide a restraint system that, while effective in restraining the vehicle occupant in emergency situations, is not so uncomfortable or confining that its use is discouraged. Safety belts that, once adjusted, do not permit normal shifting, leaning or twisting of the vehicle occupant are particularly uncomfortable and bothersome to users. Consequently, many safety belt systems include retractor mechanisms that are spring-biased to maintain the safety belt snugly against the wearer and to roll up the belt when not in use, as well as a device for locking the safety belt reel against unwinding in the event of an emergency situation. The desired reel locking characteristic has been obtained with varying degrees of success by a great variety of inertia-sensitive members that, upon actuation by an excessive change in the vehicle inertia, serves to lock the safety belt reel against unwinding. In some of these devices, the inertia-sensitive device is located in a position remote from the retractor, as illustrated in my co-pending application Ser. No. 835,604, filed Mar. 3, 1986, which shows a door-mounted retractor utilized in a passive restraint system. In this system, the inertia sensor is mounted on the vehicle and it is connected electrically to an electrically powered means which blocks out the locking of the retractor when the door is being swung open or closed. In combination with such a retractor, it is desirable to utilize a fail-safe or back-up device for locking the safety belt reel should, for some reason, the remote inertia device fail to properly operate. The back-up device should allow the web to unwind from the reel during normal occupant movement, but lock the retractor to restrain the occupant in the event of a violent or abrupt movement which would cause the inertia reel to rotate above a predetermined velocity.

Accordingly, it is the principal object of the present invention to provide an improved retractor reel locking device that selectively locks the reel against rotation based upon the rate of change of angular velocity of the reel, the device being adapted for use with a door-mounted safety belt retractor having a lock-out device remotely operated by a device sensitive to the inertia of the vehicle.

This object, and others that will become apparent upon reference to the following description and accompanying drawings, is provided by a safety belt retractor mounted on a door and having a remotely operated inertia sensitive device mounted on the vehicle chassis. The retractor comprises a frame having a reel and a pair of ratchet wheels at the opposite ends thereof mounted on a shaft journaled in the frame. The shaft is sized to extend externally of the frame and the reel receives a safety belt web rolled thereon. A locking bar is mounted to the frame so as to be pivotable into engagement with the ratchet wheel to prevent rotation of the reel in a direction to permit the unwinding of the safety belt web. A mechanical web sensitive device operates in conjunction with the electrically operated means in case the electrical means should fail. The web sensitive mechanism includes an inertia wheel which is secured on the portion of the shaft external the frame and which is mounted on the shaft so as to be rotatable with respect thereto. Means for inhibiting the rotation of the inertia wheel with respect to the reel shaft is provided so that movement of the inertia wheel relative to the reel shaft occurs only when the rate of change of angular velocity of the reel shaft exceeds a predetermined value. Additional means are associated with the inertia wheel for engaging the locking bar to pivot the locking bar into engagement with the ratchet wheel upon rotation of the inertia wheel relative to the shaft.

BRIEF DESCRIPTION OF THE FIGURES OF THE DRAWINGS

FIG. 1 is a front elevation of a safety belt retractor in conjunction with which the present invention may be advantageously utilized;

FIG. 2 is a fragmentary side elevation showing the inventive web-sensitive, reel locking mechanism;

DETAILED DESCRIPTION OF THE PREFERRED EMBODIMENT

Figure 4:
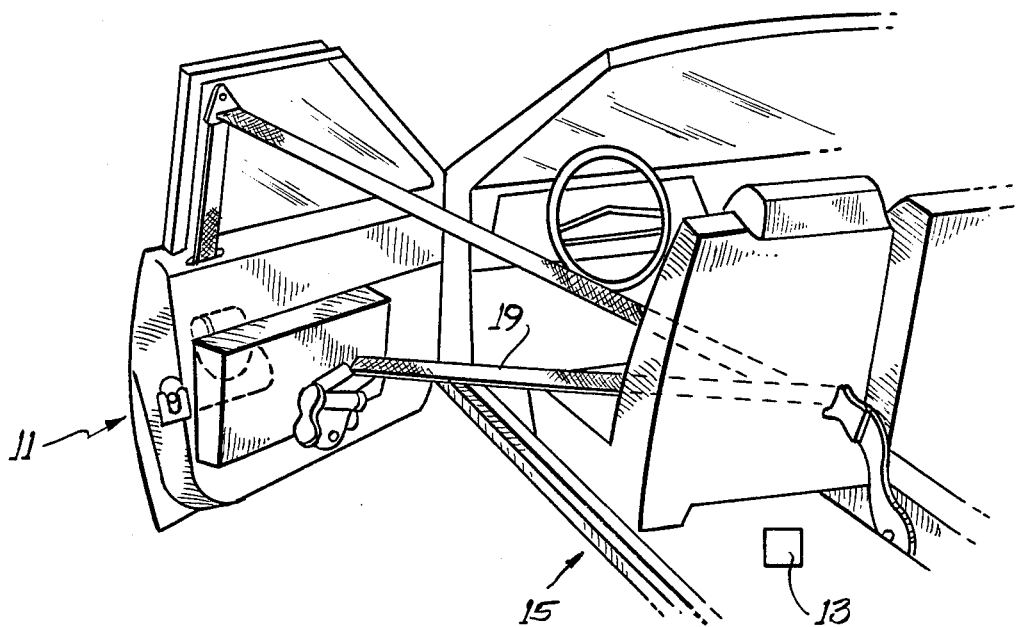
FIG. 4 is a view of a passive system having a door mounted, retractor with the reel locking mechanism shown in FIGS. 1–3.
Figure 5:
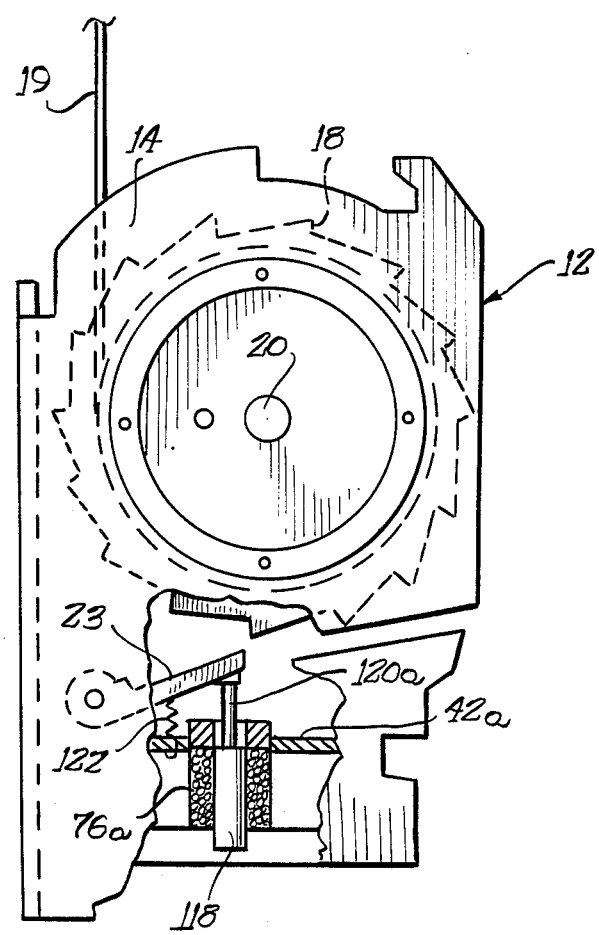
FIG. 5 is a view of the retractor mounted on the door of FIG. 4.

Referring to the Figures of the drawings, which are by way of illustration and not limitation, there is seen in FIGS. 1, 2 and 5 a retractor, generally indicated by 10, of the type that may advantageously utilize the instant invention. The retractor 10 is generally of the type shown and described in my above-noted co-pending application Ser. No. 835,604, which is herein incorporated by reference. Herein, a pair of retractors 10 are mounted in a vehicle door 11 (FIG. 4) and includes a remotely-positioned, inertia sensing device 13. The inertia sensing device may be of the kind shown in my co-pending application Ser. No. 835,605 filed Mar. 3, 1986 and hereby incorporated by reference. The inertia sensing device comprises an electrical switch which is actuated by a rolling ball, a pendulum, or other weight which is sensitive to the changing inertia of the vehicle 15 to selectively lock the retractor 10 against the unwinding of the web.

The retractor 10 includes an elongated, metal, U-shaped frame member 12 having side walls 14 that capture a reel 16 therebetween. The reel 16 is fixed to a reel shaft 20 and carries a rolled safety belt web 19 (FIG. 5) and includes opposed, toothed ratchet wheels 18 carried and fixedly secured on a shaft 20. The shaft 20 is, in turn, supported in bearings 22 carried in the side walls 14 of the frame so that the shaft 20 is rotatable with respect thereto. A lock bar 23 is pivotally mounted to the frame 12 so as to be rotatable into engagement with the teeth of the rachet wheels 18 to prevent rotation of the reel 16 in a direction that permits unwinding of the safety belt web. (Counterclockwise when viewing FIG. 1).

As fully described in the co-pending patent application Ser. No. 835,604, the preferred actuation of the lock bar 23 into the locking position is by means of an electrically operated device such as a solenoid 118 which has a coil 76a. The solenoid is mounted on a support bar 42A. An extension 120A on the solenoid plunger 120 in response to the energization of the coil 76a causes the locking bar 23 to move up to its locking position with the ratchet wheel teeth. The pawl is biased to its unlocking position spaced from the ratchet wheels by a coiled spring 122 which is connected at its lower end to the support bar 42a and its upper end to the locking bar 23.

If for some reason the electrical connection between the remote sensor 13 mounted on the vehicle chassis and the retractor 10 mounted on the door should fail or if the solenoid 118 should fail, it is desirable that there be a fail safe mechanical web sensitive device that will automatically lock the retractor reel if the web begins to pay-out very rapidly as at the time of an accident. Other remotely controlled electrically operated devices are shown in the aforementioned application and the web sensitive device 25 may be used with them also.

In keeping with the invention, the web sensitive device 25 (FIG. 2) is provided for locking the retractor reel 16 against rotation in the unwinding direction that is sensitive to the rate at which the safety belt web is being unwound from the reel. To this end, the reel shaft 20 includes on the portion that extends exterior of the frame sidewall 14, the device 25 that is sensitive to the rate of change of angular velocity of the reel shaft as it rotates in the unwinding direction. If a certain rate of change of angular velocity is exceeded, the device 25 pivots the locking bar 23 of the retractor into engagement with the teeth of the ratchet wheels 18 to lock the reel against rotation. Once the rate of change of angular velocity drops below that level, the device 25 is disabled.

Figure 3:
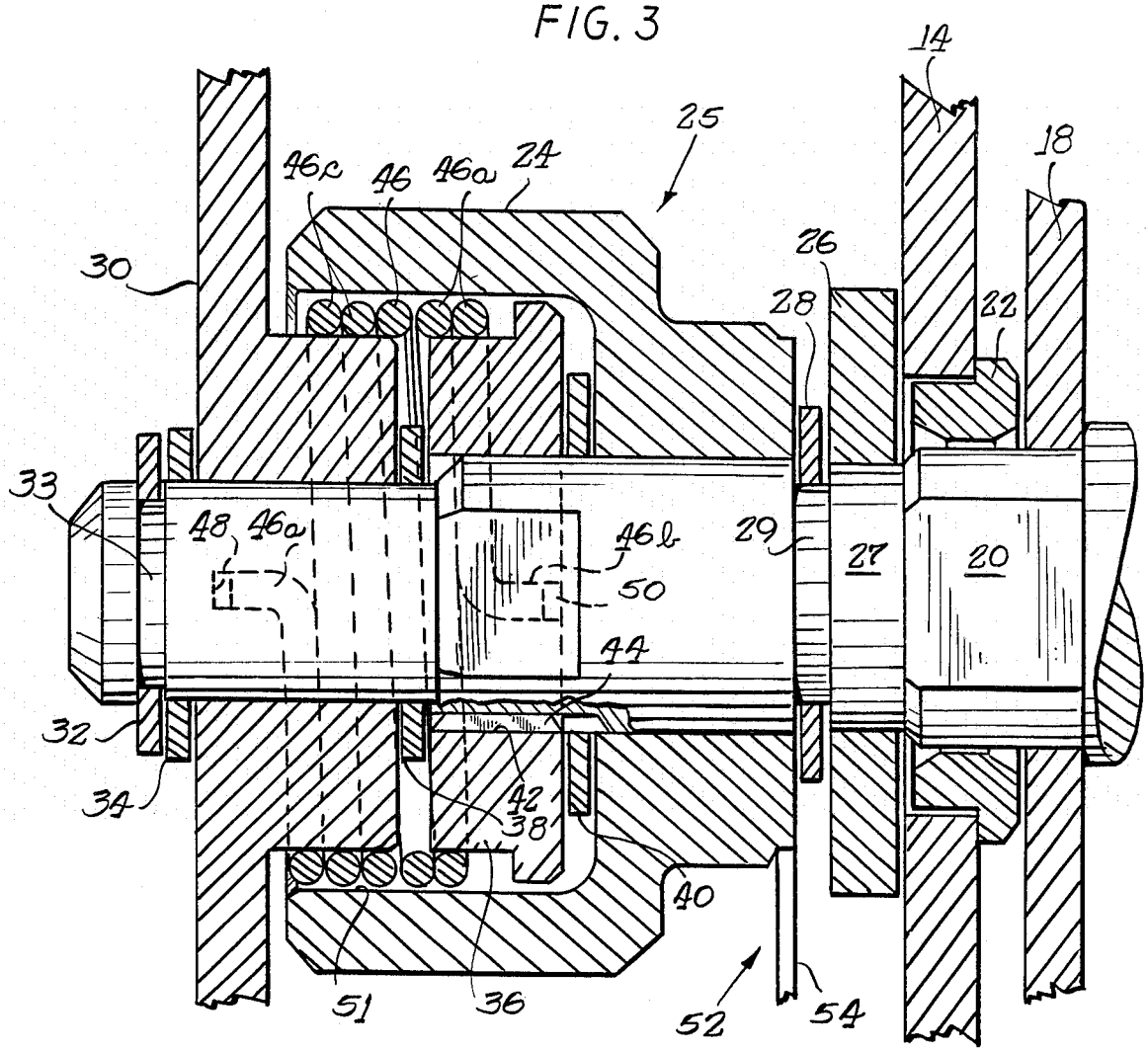
FIG. 3 is an enlarged, fragmentary cross-sectional view taken substantially along line 3—3 of FIG. 1.

As best seen in FIGS. 2 and 3, the reel shaft 20 extends externally of the frame member 12 and carries an annular hub 24 concentrically mounted thereon with the shaft 20 being free to rotate with respect to the hub 24. The hub 24 is spaced from the side wall 14 of the frame 12 by a washer 26 and snap ring 28 mounted on shouldered, different diameter portions 27 and 29 of the reel shaft 20. An enlarged-diameter inertia wheel 30 is freely mounted to turn on the end of the shaft 20 so that relative rotation between the inertia wheel 30 and shaft 20 is possible. A snap ring 32 in a groove in the shaft and a washer 34 maintain the axial location of the inertia wheel 30 with respect to the shaft 20.

At low rates of angular acceleration of the shaft 20, such as those encountered by the unwinding of the web during normal shifting of the vehicle occupant, the inertia wheel 30 rotates in unison with the shaft 20. At high angular accelerations of the shaft 20, such as those caused by the rapid unwinding of the web during an accident, the inertia of the inertia wheel 30 will cause it to lag behind the rotation of the shaft 20. This differential in angular velocity is used to actuate the locking bar 23 to lock the retractor reel 16 and arrest the unwinding of the safety belt.

Preferably, the inertia wheel is clutched to the shaft to rotate therewith until the high angular acceleration at which time the clutch engages an actuation mechanism to the shaft to actuate the locking bar into locking engagement with the ratchet wheels. To this end, the shaft 20 supports a drive drum 36 interior of the side walls of the annular portion of the hub 24. The drum 36 is spaced from the hub 24 and inertia wheel 30 by washers 38 and 40. To ensure that the drum 36 and the shaft 20 rotate in unison, the drive drum 36 and shaft have a common keyway 42 that receives a key 44 on the shaft 20. The inertia wheel 30 is clutched to rotate in unison with the reel shaft 20 by means of a coiled spring or clutch means 46 located within the annulus of the hub 24 and connecting the inertia wheel 30 to the drive 36. As illustrated, the inertia wheel 30 and drive drum 36 are formed with, respectively, slots 48 and 50 that seat the ends 46a and 46b (FIG. 3) of the coiled spring 46. Under normal operating conditions, the spring 46 is sufficiently stiff to overcome the angular inertia of the wheel 30 and ensure that the inertia wheel 30 rotates in unison with the reel shaft 20 during the unwinding of the web from the reel 16. However, should the web be suddenly unwound from the reel 16, the inertia force of the wheel 16 becomes greater than the force of the spring 46, and the inertia wheel 30 lags behind with respect to rotation of the reel shaft 20. With the inertia wheel 30 lagging behind the wheel shaft 20, the inertia wheel exerts a force on the spring 46 tending to uncoil it and, consequently, causing the spring coils 46c to radially expand. The spring coils 46 radially expand until they engage inner wall 51 of the annular portion of the hub 24 of the actuator mechanism 52, upon which the spring 46 acts like a clutch to cause the hub 24 to rotate in unison with the shaft 20 in the unwinding direction.

Fixedly secured to the hub 24 is the actuator mechanism or means, generally designated by 52, that, upon rotation of the hub due to clutching engagement with the spring 46, serves to pivot the locking bar 23 into engagement with the teeth of the ratchet wheels 18 to lock the reel 16 against rotation in the unwinding direction, thus restraining the vehicle occupant against violent movement. As best seen in FIGS. 1 and 2, the actuator means 52 comprises an arm 54 integral with the hub 24. The lower extent of the arm 54 is formed with an inturned flange 56 which is located beneath the locking bar 23 and which cams the locking bar upwardly upon rotation of the hub 24. Herein, the inturned flange 56 has an inclined cam surface 57, which when the actuator arm swings counterclockwise as viewed in FIG. 1 slides along the underside of an extension of the lock bar projecting exteriorly of the frame side wall 14 to cam the lock bar to pivot upwardly to bring it into engagement with the teeth of the ratchet wheels 18.

To restrain the annular hub 24 from rotating with the shaft 20 due to frictional forces therebetween (but to permit rotation upon clutching engagement of the spring 46 with hub 24), and to draw the actuating arm 54 out of engagement with the locking bar after the unwinding motion of the reel 16 has been arrested, a return contractile spring 58 is operatively connected to the actuator arm to urge the arm 54 in the unlocking direction (clockwise as viewed in FIG. 1). The spring 58 has one end 59 hooked to a bracket 60 secured to the side wall 14 of the retractor frame 12 by screws 62 and the other end 61 of the spring is hooked to the arm 54. While a spring 58 is shown in the illustrated embodiment, other resilient or biasing means may be used to restore the arm 54 to its desired initial location.

As best seen in FIG. 4, the retractor 10 is mounted on the door 11 and the locking bar is normally biased by the spring 122 to be spaced from the ratchet wheel teeth until such time as the inertia switch means 13 on the vehicle chassis operates at a predetermined G-force. The web sensitive mechanism disclosed in FIGS. 1-3 operates in conjunction with the solenoid 118 to assure that the locking bar is in locking engagement with the ratchet wheels 18 which will usually be when the vehicle chassis is suddenly stopping and the doors 11 are closed. If the electrical circuit should fail, then the mechanical web-sensitive device will operate as a fail-safe to lock the retractor. Both the solenoid and the web-sensitive device operate satisfactorily at various angles to the vertical whereas many inertia weight and pendulum devices are sensitive to the angle at which they are mounted and will not operate at high degrees of tilting relative to the vertical. That is, the electrical actuator or solenoid 118 will operate at angles beyond 17° to the vertical and the retractor frame and lock bar may be mounted at almost any angle to the vertical and operated, which is not true of where the inertia weight is mounted to actuate directly and mechanically the lock bar.

Thus a web-sensitive retractor lockout mechanism has been provided that meets the object of the instant invention. Although the invention has been described in terms of a preferred embodiment, there is no intent to limit the invention to the same. On the contrary, it is intended to cover all the equivalents and modifications within the scope of the appended claims.

What is claimed is:

1. In a passive seat belt system, the combination comprising: a door mounted seat belt retractor having a reel and ratchet wheels thereon, a locking bar on the retractor to lock the ratchet wheels against belt pay-out, electrically operated means for shifting the locking bar to the locking position, inertia sensing means on a vehicle chassis for sensing the change in velocity of the vehicle and for operating the electrically operated means with predetermined rate of change of the vehicle chassis' velocity, and a web sensitive inertia means mounted on the reel on the door and sensitive to reel unwinding velocity rate of change to shift the locking bar into locking engagement with the ratchet wheels; said web sensitive inertia means operating independently of said electrically operated means and serving as a fail safe for the electrically operated means if the latter should fail.

2. A passive seat belt system in accordance with claim 1 in which means bias the locking bar from locking engagement with said ratchet wheels, and in which said web sensitive inertia means includes an actuator means for shifting the locking bar against the urging of said biasing means into locking engagement with said ratchet wheels, and clutch means clutch the actuator means to the reel to force the locking bar against the urging of said biasing means into locking engagement with said ratchet wheels.

3. An apparatus in accordance with claim 2 including a reel shaft on said reel and in which said clutch means comprises a coiled spring encircling said reel shaft.

4. An apparatus in accordance with claim 3 in which said actuator means includes an actuator arm having cam means thereon to cam the locking bar into locking engagement with said ratchet wheels.

5. In a safety belt retractor, an elongated frame, a reel having a pair of ratchet wheels at the opposite ends thereof mounted on a shaft journaled in the frame, the shaft extending externally of the frame, a rolled safety belt web on the reel, a locking bar mounted to the frame so as to be pivotable into engagement with the ratchet wheel to prevent rotation of the reel in a direction to permit unwinding of the safety belt web, an inertia wheel secured on the portion of the shaft external the frame, the inertia wheel being mounted on the shaft so as to be rotatable with respect thereto, a coiled spring clutch means clutching the inertia wheel to turn with the shaft at low rates of velocity change, said clutch means releasing the inertia wheel at higher rates of change of velocity for allowing rotation of the inertia reel relative to said shaft only upon the rate of change of angular velocity of the reel shaft exceeding a predetermined value, and actuator means coupled by said clutch means upon relative rotation of the inertia wheel relative to said shaft to pivot said locking bar into engagement with the ratchet wheels to stop pay out of the safety web.

6. In a safety belt retractor, an elongated frame, a reel having a pair of ratchet wheels thereon mounted on a shaft journaled in the frame, the shaft having a portion extending externally of the frame, a rolled safety belt web on the reel, a locking bar mounted to the frame so as to be pivotable into engagement with the ratchet wheel to prevent rotation in a direction to permit unwinding of the web, an inertia wheel secured on the portion of the shaft externally of the frame, the inertia wheel capable of rotation with respect to the shaft, coiled spring means concentric with the shaft, one end of the coiled spring being fixed to the shaft, the other end of the coiled spring being fixed to the inertia wheel to tend to prevent relative rotation between the inertia wheel and the shaft, an annulus mounted on the shaft so as to permit rotation of the shaft with respect thereto, the annulus having side walls overlying the coiled spring and spaced therefrom, means secured to the annulus for engaging the locking bar, such engagement occuring when the rate of angular velocity of the reel due to safety belt protraction increases at a rate at which the coiled spring means can no longer exert a force to overcome the angular momentum of the inertia wheel, the coiled spring radially expanding upon the rotation of the inertia wheel with respect to the shaft so as to engage the side walls of the annulus to cause the annulus to rotate in unison with the shaft and rotate the lock bar engaging means into contact with the lock bar so that the lock bar engages the teeth of the ratchet wheels.

7. The combination of claim 6 including an arm integral with the annulus, the arm being rotated into engagement with the locking bar on rotation of the annulus.

8. The combination of claim 7 wherein a return spring means interconnects said arm with the frame so as to restrain the annulus from rotating with the shaft due to frictional forces therebetween and to draw the lock bar engaging the arm out of engagement with the lock bar after the unwinding motion of the reel has been arrested.

9. The combination of claim 8 in which a drive drum is secured to the shaft interior of the side walls of the annulus.

10. A seat belt retractor apparatus comprising:
a frame, a reel mounted on said frame for rotation and having a seat belt wound thereon, a pair of ratchet wheels on said reel rotatable therewith, a locking bar on the retractor to lock the ratchet wheels against belt pay-out, electrically operated means including an electrically powered actuator for shifting the locking bar to the locking position, a web sensitive inertia means mounted on the reel and sensitive to reel unwinding velocity rate of change to shift the locking bar into locking engagement with the ratchet wheels; said web sensitive inertia means operating independently of said electrically operated means and serving as a fail safe for the electrically operated means if the latter should fail,
said frame adapted to be mounted at angle of more than 17° to the vertical, and
an inertia sensing switch means including an inertia weight separated from said electrically powered actuator for operation with a predetermined change in the vehicle's velocity to operate the electrically powered actuator to shift the locking bar to the locking position while the retractor is at angle of more than 17° to the vertical.

* * * * *